United States Patent [19]
Kato et al.

[11] Patent Number: 5,653,661
[45] Date of Patent: Aug. 5, 1997

[54] LOCK-UP CLUTCH SLIP CONTROL FOR AN AUTOMATIC TRANSMISSION

[75] Inventors: Yoshifumi Kato, Nishikamo-gun; Ichiro Yamauchi; Masami Fujitsuna, both of Kariya, all of Japan

[73] Assignee: Nippondenso Co., Ltd., Kariya, Japan

[21] Appl. No.: 607,876

[22] Filed: Feb. 29, 1996

[30] Foreign Application Priority Data

Mar. 1, 1995 [JP] Japan .................... 7-041897

[51] Int. Cl.$^6$ .................... F16H 61/14
[52] U.S. Cl. .................... 477/176; 477/169
[58] Field of Search .................... 477/168, 169, 477/176

[56] References Cited

U.S. PATENT DOCUMENTS

| 4,466,311 | 8/1984 | Hiramatsu . |
| 4,468,988 | 9/1984 | Hiramatsu . |
| 5,531,302 | 7/1996 | Koenig et al. .................... 477/176 |

FOREIGN PATENT DOCUMENTS

| 60-1459 | 1/1985 | Japan . |
| 2-59330 | 12/1990 | Japan . |
| 3-84262 | 4/1991 | Japan . |
| 3-62942 | 9/1991 | Japan . |
| 4-331868 | 11/1992 | Japan . |
| 5-231531 | 9/1993 | Japan . |

Primary Examiner—Dirk Wright
Attorney, Agent, or Firm—Cushman, Darby & Cushman IP Group of Pillsbury Madison & Sutro LLP

[57] ABSTRACT

A slip control apparatus provides a smooth response of actual slippage amount during a transitional period when a lock-up clutch is shifting from a disengaged state to a slipping state, and quickly determines a response to external disturbances when the slipping of the clutch is in a steady state. The apparatus has a first control unit for outputting a first control value based on the difference between target slippage amount and actual slippage amount, a second control unit for outputting a second control value based on the actual slippage amount, and a clutch pressure regulating unit for controlling an electromagnetic valve to control a lockup system on the basis of the sum of the first and second control values. The first control unit performs control for the transitional state of the lock-up clutch between the disengaged state and the slipping state. The second control unit performs control in response to external disturbances when the slipping of the clutch has reached the steady state via the transitional state.

18 Claims, 14 Drawing Sheets

LARGE THROTTLE OPENING
(SMALL TIME CONSTANT)

SMALL THROTTLE OPENING
(LARGE TIME CONSTANT)

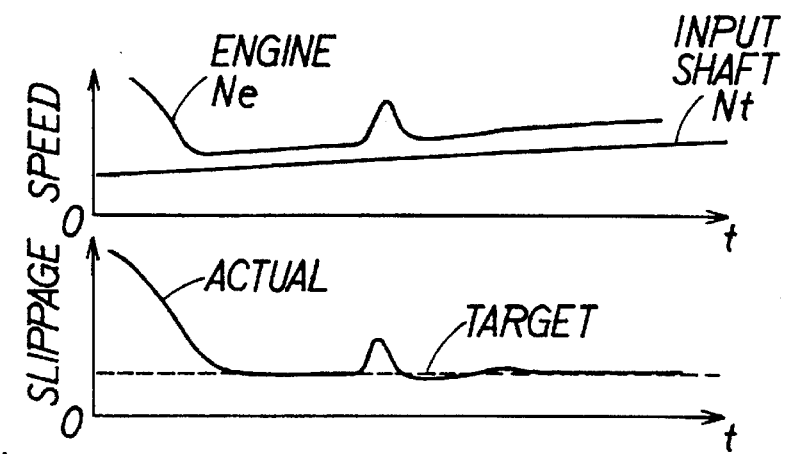
FIG. 5A1
FIG. 5A2
FIG. 5A3
SLIP CONTROL START
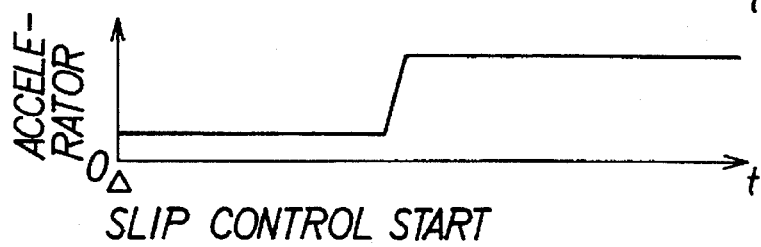
FIG. 5B
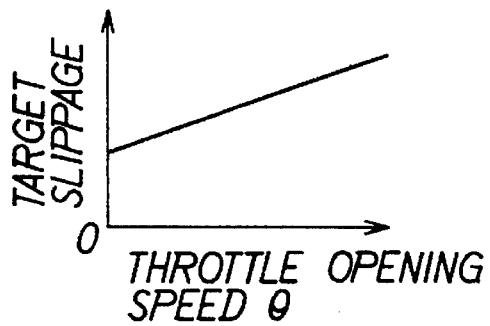
FIG. 5C
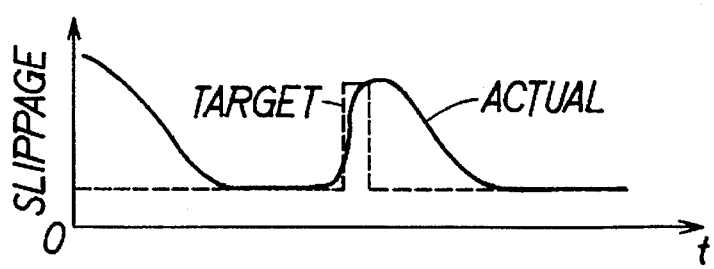

LOCK-UP CLUTCH SLIP CONTROL FOR AN AUTOMATIC TRANSMISSION

BACKGROUND OF THE INVENTION

1. Field of the invention

The present invention relates to a lock-up clutch slip control for an automatic transmission that feedback-controls the engaging pressure of a lock-up clutch so that the slippage amount of the lock-up clutch will become equal to a target value.

2. Description of Related Art

A control apparatus for a vehicle hydrodynamic or hydraulic transmission having a direct-coupling clutch, such as a torque converter TC with a lock-up clutch LC, has been proposed which causes the direct-coupling clutch to slightly slip in order to, for example, absorb the periodical engine torque fluctuation that occurs during low speed traveling of the vehicle. The slippage amount herein means the difference between the rotational speed at the input of the direct-coupling clutch (usually, the engine speed) and the rotational speed at the output thereof (usually, the rotational speed of the transmission input shaft) (see FIG. 18A).

For example, a vehicle automatic transmission control apparatus described in Japanese examined patent application publication No. SHO 63-13060 (U.S. Pat. Nos. 4,466,311 and 4,468,988) controls the actual slippage amount of the direct-coupling clutch so as to become equal to a target slippage amount determined within a range of 10 to 20 rpm if it is determined that the traveling condition of the vehicle represented by the engine speed and the like is in a prestored slippage region.

However, in the conventional slip control apparatus for a vehicle hydrodynamic transmission having a direct-coupling clutch as described above, when the direct-coupling clutch is switched from a disengaged state to a slip-controlled state, the slippage amount is sharply reduced from a large amount allowed in the disengaged state. Such sharp reduction of the slippage amount causes the following drawbacks:

1. The sharp actual slippage reduction caused by the starting of the slip control as indicated by the solid line in FIG. 18B rapidly reduces the engine speed as indicated in FIG. 18C. As a result, the inertia of the engine is released to produce shocks, thus degrading the driving smoothness.

2. At the start of the slip control, excessively large pressures are caused on the clutch because of the inertia of the hydraulic system. As a result, the direct-coupling clutch becomes temporarily but completely engaged (zero slippage) as indicated by the solid line in FIG. 18B, thus producing shocks.

This undesired event can be avoided by employing a slip control system that comprises a feedback compensation unit, a clutch pressure control unit and a lock-up clutch system and feeds back the actual slippage amount as illustrated in FIG. 19A to control the response of actual slippage amount (indicated by the solid line in FIG. 19B1) to the stepwise changes of the target slippage amount (indicated by the broken line in FIG. 19B) so as to achieve smooth transition free from undershooting as indicated by the dot-dash line in FIG. 18B. However, such a control system suffers other problems stated below in connection with the tuning of the control unit as described above.

In the case where the throttle opening (FIG. 19B2) is rapidly reduced so that the engine torque sharply decreases during the ordinary slip control by which the slippage amount is controlled to a predetermined value, the engaging pressure of the direct-coupling clutch needs to be reduced to maintain the slippage amount at the same level. However, since the control unit used in the aforementioned control system has been tuned so as to have moderate responsiveness, the correction of the engaging pressure is delayed, and the direct-coupling clutch becomes completely engaged for a short time, thus producing shocks.

SUMMARY OF THE INVENTION

The present invention is intended to solve the above-stated problems.

It is an object of the invention to provide a lock-up clutch slip control for an automatic transmission that provides a smooth response waveform of the actual slippage amount in a transition period when the clutch is switched from the disengaged state to the slipping state and quickly sets up a response to external disturbances, such as throttle opening changes, in the steady state.

BRIEF DESCRIPTION OF THE DRAWINGS

The foregoing and further objects, features and advantages of the present invention will become apparent from the following description of preferred embodiments with reference to the accompanying drawings, wherein:

FIGS. 3A1–3A3, 3B are for illustration of the principle of a further feature of the invention;

FIGS. 5A1–5A3, 5B and 5C are for illustration of the principle of a further feature of the invention;

FIGS. 8A, 8B1–8B2 are for illustration of the design of the control system according to Embodiment 1;

FIGS. 19A, 19B1–19B2 also illustrate the conventional control.

DETAILED DESCRIPTION OF THE PREFERRED EMBODIMENTS

The present invention will be described hereunder with reference to the accompanying drawings. It is to be noted that the invention is described first generally with reference to FIGS. 1–6 and then in detail with respect to various embodiments illustrated in FIGS. 7–17.

First, construction of a vehicle hydrodynamic or hydraulic automatic transmission having a lock-up clutch (direct-coupling clutch) to which a slip control of the invention is applied is described with reference to FIG. 6.

Figure 6:
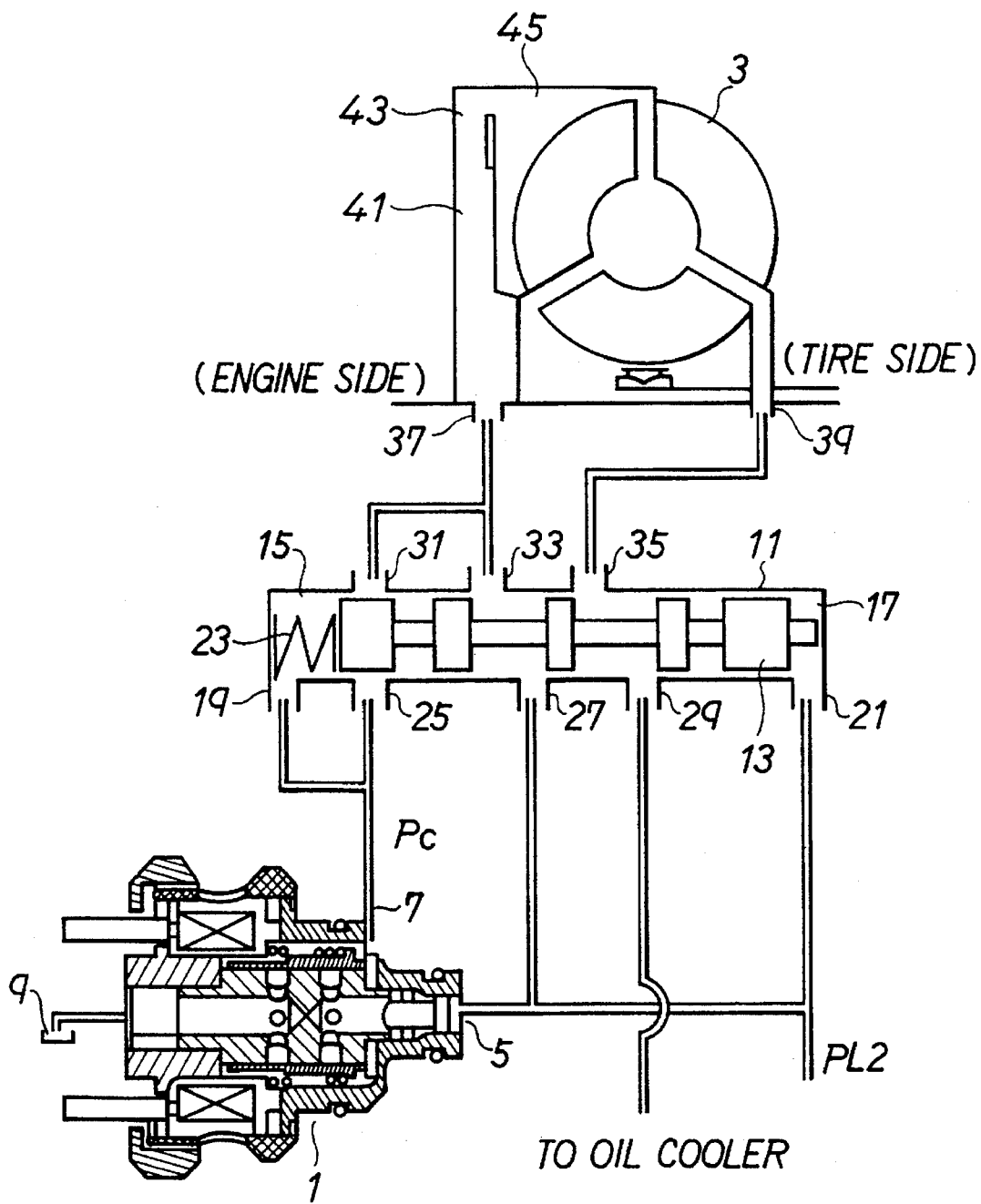
FIG. 6 schematically illustrates a hydrodynamic transmission with a lock-up clutch.

As shown in FIG. 6, the hydrodynamic transmission comprises an electromagnetic valve 1 having a solenoid mechanism for pressure control. The electromagnetic valve 1 is on-off controlled on the basis of a lock-up control instruction of a torque converter 3, that is, the opening of the electromagnetic valve 1 is controlled proportionally to the duty ratio.

When the electromagnetic valve 1 is not excited, the input hydraulic pressure to a port 5 is distributed to an output port 7, and the port 5 is supplied with a secondary pressure PL2 set by a regulator (not shown), so that the pressure PL2 is extracted as a control hydraulic pressure Pc (PL2=Pc). When the electromagnetic valve 1 is excited, the port 7 becomes communicated with an outlet drain 9. By controlling the rapid switchover of the excited and unexcited states of the electromagnetic valve 1, the pressure on the output port 5 can be determined to a desired value under the condition of Pc<PL2.

Corresponding to the electromagnetic valve 1, a spool valve 11 is provided as a direction switching valve for lock-up control. The spool valve 11 comprises a valve body 13 and hydraulic pressure chambers 15, 17 provided on the opposite ends of the valve body 13. The hydraulic pressure chambers 15, 17 are provided with ports 19, 21, respectively. The valve body 13 is shifted to the left or right in the figure in accordance with the hydraulic pressures provided in the hydraulic pressure chambers 15, 17. The hydraulic pressure chamber 15 has a spring 23 that urges the valve body 13 toward the hydraulic pressure chamber 17. The control hydraulic pressure Pc from the electromagnetic valve 1 acts on the hydraulic pressure chamber 15, via a port 19.

The hydraulic pressure chamber 17 receives the secondary pressure PL2 through a port 21. When the electromagnetic valve 1 is not in operation and therefore Pc=PL2, that is, when the pressures inside the hydraulic pressure chambers 15, 17 are equal, the valve body 13 is shifted to the right as shown in the figure by the force of the spring 23. When the electromagnetic valve 1 is operated so that Pc<PL2, the pressure in the hydraulic pressure chamber 17 will become greater than the combination of the pressure in the hydraulic pressure chamber 15 and the force from the spring 23, to shift the valve body 13 to the left in the figure.

In addition to the input ports 19, 21 provided at the opposite ends, the spool valve 11 has a port 25 for receiving an output pressure Pc from the electromagnetic valve 1, a port 27 for receiving the secondary pressure PL2, and a port 29 for supplying outlet fluid to an oil cooler (not shown). The spool valve 11 further has ports 31, 33, 35 that are selectively communicated with the ports 25, 27, 29 in accordance with the position of the valve body 13. When the valve body 13 is shifted to the right end as shown in FIG. 6, the ports 27 and 33 are communicated and the ports 29 and 35 are communicated. When the valve body is shifted to the left, the ports 25 and 31 are communicated and the ports 27 and 35 are communicated.

The torque converter 3 has an off port 37 and an on port 39. A clutch control fluid chamber 41 is defined continuously from the off port 37. In accordance with the pressure inside the clutch control fluid chamber 41, a clutch mechanism (lock-up clutch) 43 is controlled to engage or disengage the input shaft and the output shaft. In addition, while the secondary pressure PL2 acts on the off port 37, the control fluid flows from the clutch control fluid chamber 41 into the torque converter hydraulic pressure chamber 45 to disengage the lock-up clutch 43.

In the hydrodynamic transmission with the lock-up clutch 43, the coil of the electromagnetic valve 1 is not supplied with electricity when the lock-up is not operated. In such state, the ports 5 and 7 of the electromagnetic valve 1 are communicated so as to establish Pc=PL2, the valve body 13 of the spool valve 11 is positioned as shown in FIG. 6. As a result, the secondary pressure PL2 acts on the off port 37 of the torque converter 3 via the ports 27, 33, and the control fluid flows from the clutch control fluid chamber 41 into the torque converter hydraulic pressure chamber 45 to set the lock-up clutch 43 to the disengaged state, thus putting the lock-up system into non-operation state.

On the other hand, to operate the lock-up system, excitation current is intermittently supplied to the solenoid of the electromagnetic valve 1, thus performing duty control. A desired control pressure is thereby provided under the condition of Pc<PL2.

If the pressure Pc decreases, the spool driving force of the pressure PL2 acting on the hydraulic pressure chamber 17 of the spool valve 11 becomes greater than the total of the spool driving force of the pressure Pc acting on the hydraulic pressure chamber 15 and the spool driving force of the spring 23, so that the valve body 13 is shifted to the left in FIG. 6. Thus, the ports 25 and 31 become communicated to communicate the electromagnetic valve 1 directly with the clutch control fluid chamber 41 so that the control pressure Pc is supplied to the clutch control fluid chamber 41. Simultaneously, the ports 27 and 35 of the spool valve 11 become also communicated to supply the secondary pressure PL2 to the on port 39 of the torque converter 3.

In this state, the pressure inside the clutch control fluid chamber 41 becomes equal to the control hydraulic pressure from the electromagnetic valve 1, and the lock-up clutch 43 is maintained in an intermediate position in accordance with the difference between the hydraulic pressure PL2 supplied to the torque converter hydraulic pressure chamber 45 and the control pressure Pc supplied to the clutch control fluid chamber 41, thus performing slip control. The slip condition of the lock-up clutch 43 is controlled on the basis of the control pressure Pc that is controlled by the electromagnetic valve 1. After that, the hydraulic pressure inside the clutch control fluid chamber 41 is controlled so that the lock-up clutch 43 will be completely engaged, by gradually reducing the control hydraulic pressure Pc of the electromagnetic valve 1.

As understood from the above description, the hydrodynamic transmission with the lock-up clutch 43 is controlled by using the single lock-up controlling electromagnetic valve 1 and the single lock-up controlling spool valve 11. The valve body 13 of the spool valve 11 is switched over in position by the control hydraulic pressure Pc determined by the electromagnetic valve 1 and the spring 23. That is, by simply controlling the electromagnetic valve 1 to control the control hydraulic pressure Pc, the spool valve 11 can be switched over so as to, for example, engage the lock-up clutch 43 during the lock-up operation, and the pressure inside the clutch control fluid chamber 41 can be regulated. Thereby, the lock-up control of the torque converter 43 can be performed with high precision.

Figure 1:
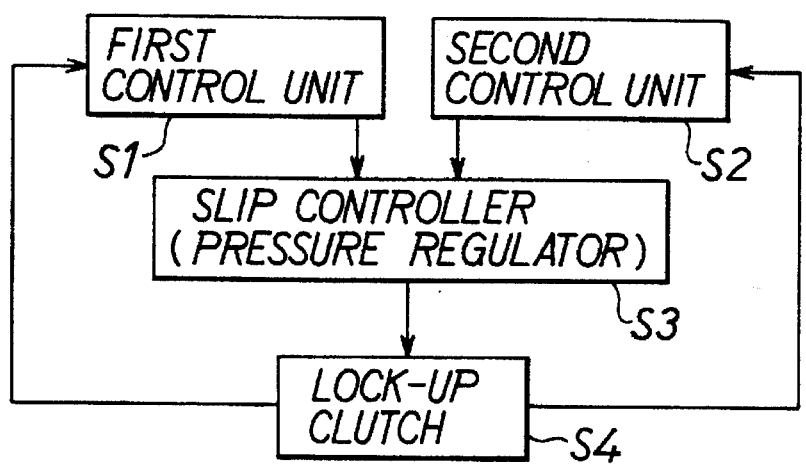
FIG. 1 schematically illustrates a construction of the invention.
Figure 2A:
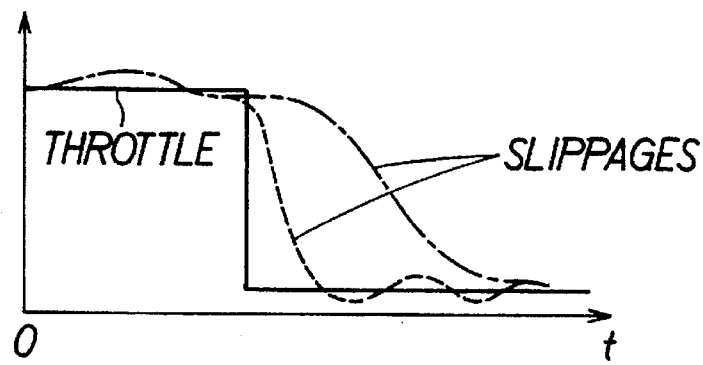
FIGS. 2A, 2B are for illustration of the principle of the main feature of the invention.
Figure 2B:
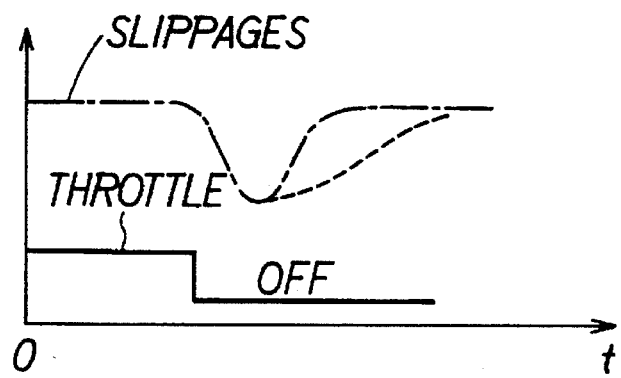

For the lock-up clutch control, i.e., for the control of the electromagnetic valve 1, as shown in FIG. 1, a first control unit S1 is provided to specify a response behavior of the actual slippage amount to a target slippage amount in a transition period when the lock-up clutch is being switched from the disengaged state to the slipping state. A second control unit S2 is provided independently of the first control unit S1, controls the actual slippage amount of the lock-up clutch S4 through a slip controller S3 (pressure regulator) so as to follow the target slippage amount when the slipping of the lock-up clutch S4 has reached the steady state where the slippage amount is maintained at a predetermined slippage amount via the transitional state.

As a result, the first control unit S1 achieves a smooth response of the actual slippage amount through the slip controller S3 during the transitional period when the lock-up clutch is being switched from the disengaged state to the slipping state, and the second control unit performs quick setup of the response waveform to external disturbances, such as throttle opening fluctuation, in the steady state. In addition, the slip control in relation to accelerating operation from the steady slip state and the transition control when the throttle opening is small can also be performed with substantial smoothness.

If a single control unit is employed for the control based on the difference between the actual and target slippage amounts as in the conventional art, the control unit must be tuned in accordance with either the transitional state between the disengaged state and the slipping state or external disturbances in the steady state. The tuning to the transitional state may provide favorable response for the transitional state as indicated by the broken line in FIG. 2A, but will result in unfavorable response to the external disturbances in the steady state as indicated by the broken line in FIG. 2B. On the other hand, the tuning of the control unit to the external disturbances in the steady state may provide favorable response to the external disturbances as indicated by the dot-dash line in FIG. 2B, but will result in unfavorable response for the transitional state between the disengaged state and the slipping state.

However, with the aforementioned first and second control units S1 and S2 having different characteristics that are independent from each other, favorable response can be achieved for the transitional state between the disengaged state and the slipping state and also for the external disturbances, such as throttle opening fluctuation, in the steady state.

Further, the second control unit S2 restrains the integration of differences between the actual and target slippage amounts in the transitional period when the lock-up clutch is being switched from the disengaged state to the slipping state. Thereby, the transition control can be performed in a stable manner during the transitional period when the lock-up clutch is being switched from the disengaged state to the slipping state, particularly in a region where engine speed is relatively low, such as when the throttle opening is small. The advantage of this feature will be discussed in detail below.

For example, in a hydrodynamic transmission with a lock-up clutch 43 as shown in FIG. 6, only a small amount of hydraulic fluid is supplied to a secondary pressure regulatory valve (not shown) in a region where the engine speed is relatively low. In addition, during the transitional period the control fluid flows from an on-port 39 to a clutch control hydraulic pressure chamber 41 that is maintained at a low pressure. Because of these facts, the pressure on the on-port 39 communicated with the secondary pressure regulatory valve temporarily decreases in the transitional period when the lock-up clutch 43 is entering the slipping state. As a result, appropriate differential pressure cannot be produced despite the controlling of the pressure in the clutch control hydraulic pressure chamber 41, so that the actual slippage amount does not respond in a desired manner (the slippage amount does not decrease). Thus, a large difference between the target and actual slippage amounts occurs.

To increase the differential pressure, the second control unit S2 performs integration and instructs to reduce the pressure of the clutch control hydraulic pressure chamber 41, in order to gradually increase the engaging pressure of the lock-up clutch 43. As the engaging pressure of the lock-up clutch 43 is varied, the clutch control hydraulic pressure chamber 41 becomes a closed state, and the amount of fluid flowing from the on-port 39 into the clutch control hydraulic pressure chamber 41 is rapidly reduced. The pressure on the on-port 39 is thereby increased, resulting in a rapid increase of the differential pressure.

The rapid increase of the differential pressure causes a rapid reduction of the slippage amount. However, if the clutch control hydraulic pressure instruction duty has a large value as indicated in FIG. 3A1 because of the integrating operation, correction of the clutch control hydraulic pressure may be carried out too slowly as indicated in FIG. 3A2, allowing the clutch to completely lock up as indicated in FIG. 3A3.

Figure 3B:
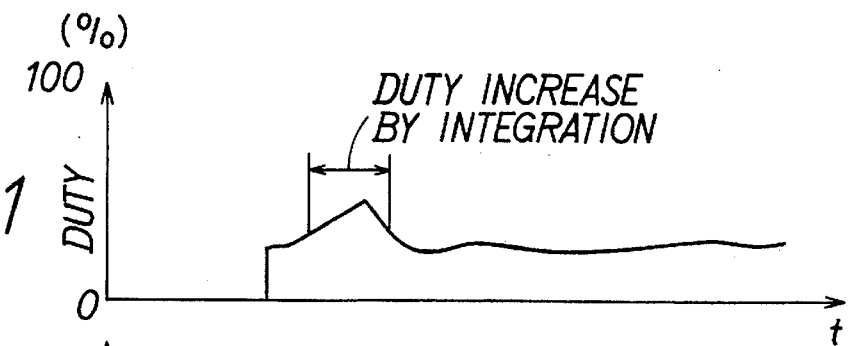
Figure 3B:
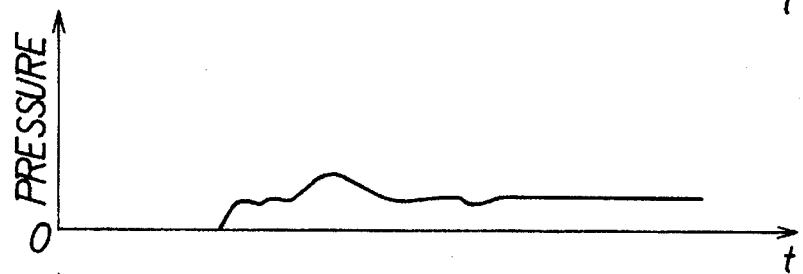
Figure 3B:
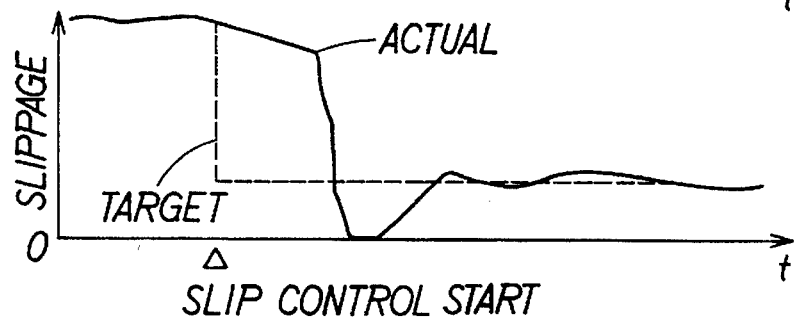
Figure 3B:
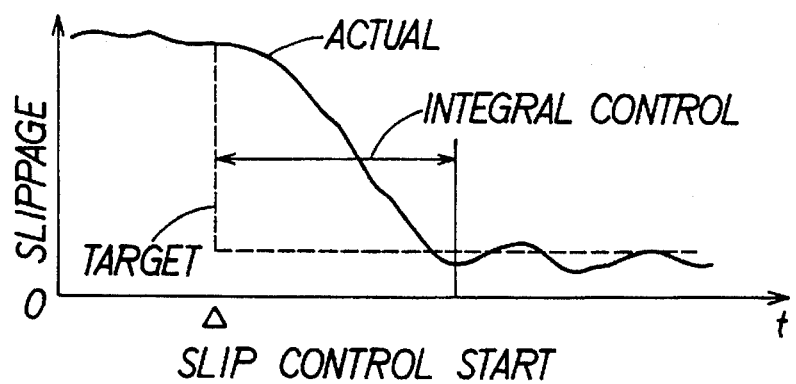

Accordingly, the slip control restrains the integrating operation in the transitional period when the lock-up clutch is being switched from the disengaged state to the slipping state as indicated in FIG. 3B to prevent the integrating operation from providing an unnecessarily large value of the clutch control hydraulic pressure instruction duty, so that correction of the clutch control hydraulic pressure will be made in time even when the actual slippage amount is rapidly reduced. Thereby, favorable control of the actual slippage amount to the target slippage amount can be achieved without causing the clutch to lock up.

Further, the integration restraining function may include inhibition of the integrating operation for a predetermined length of time.

Figure 4A:
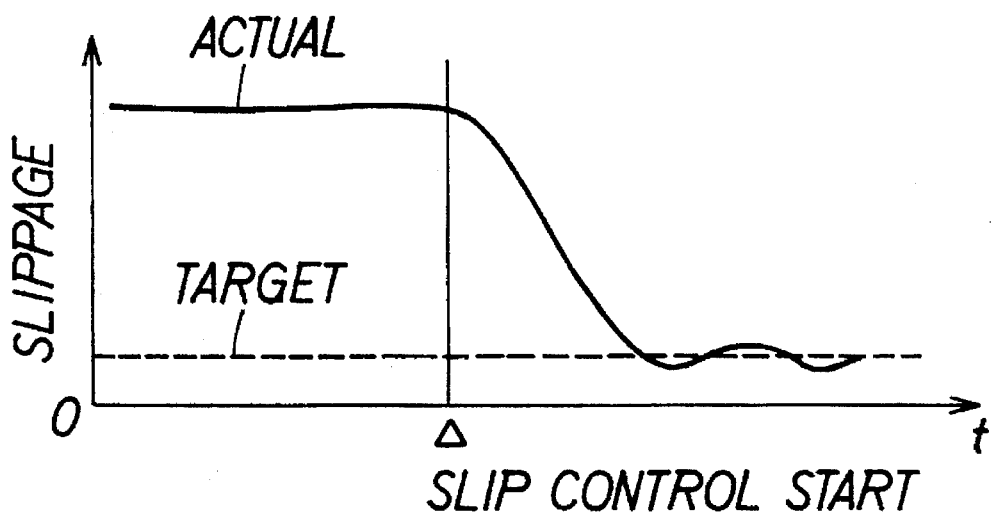
FIGS. 4A, 4B are for illustration of the principle of a still further feature of the invention.
Figure 4B:
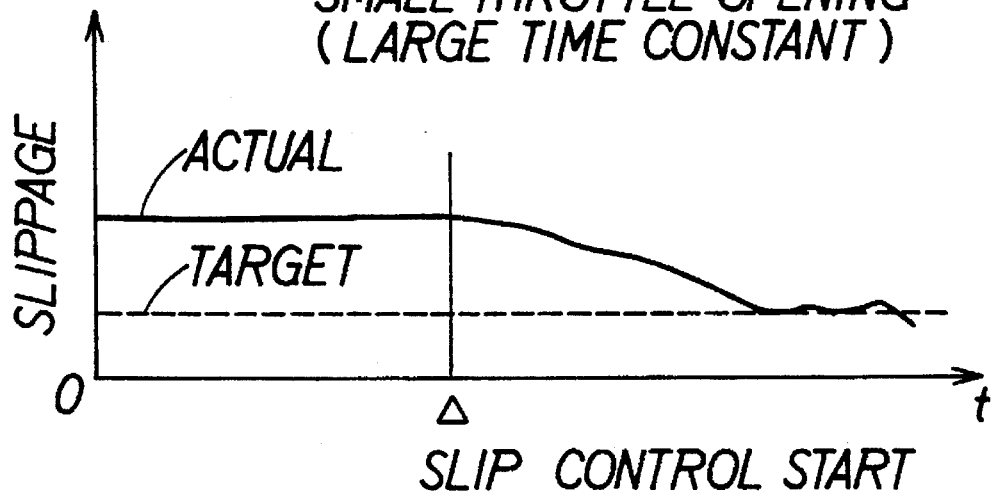

Furthermore, substantially the same effect as provided by the integration restraint of the second control unit S2 can also be achieved by designing the first control unit S1 as follows. The first control unit is designed to vary the time constant of the response of actual slippage amount in accordance with the current throttle opening and/or the initial slippage amount. That is, the first control unit increases the time constant of the response of the actual slippage amount to the target slippage amount during the transitional period, for example, when the throttle opening is small, as compared with when the throttle opening is large, as indicated in FIGS. 4A and 4B. This operation prevents occurrence of large differences between the target and actual slippage amounts so that the value of the clutch control hydraulic pressure instruction duty will not become unnecessarily large. Thereby, clutch hydraulic pressure can be corrected in time even when the actual slippage amount is rapidly reduced. Favorable control of the actual slippage amount to the target slippage amount can thus be achieved without causing the clutch to lock up.

Further, the first control unit S1 reduces the time constant of the response of the actual slippage amount as the throttle opening and/or the initial slippage amount increases, thus achieving favorable control of the actual slippage amount to the target slippage amount.

Furthermore, the target slippage amount is varied depending on the throttle opening changing rate, thus achieving stable slip control.

In addition, if the throttle opening changing rate is a positive value when the slipping of the lock-up clutch reaches the steady state from the transitional state, the target slippage amount is increased. Stable slip control can thus be performed without degrading driving feels or the like even when the throttle opening is increased while the slipping is controlled in the steady state.

The advantage of this feature will be more specifically described. In the case where the slipping of the clutch has reached the steady state where the slippage amount remains at the same level (for example, 500 rpm) after experiencing the transitional state where the lock-up clutch is shifting from the disengaged state to the slipping state, if the accelerator pedal is depressed, the engine speed temporarily increases and the actual slippage amount accordingly increases as indicated in FIGS. 5A1–5A3. Then, by operation of the second control unit, which specifies the behavior of response to external disturbances such as throttle opening fluctuation, the engaging pressure of the lock-up clutch is increased so that the actual slippage amount gradually becomes equal to the target slippage amount again.

However, since the engine speed increase is restrained in this case as compared with the case where the lock-up clutch is disengaged, insufficient accelerating feel or knocking will likely be caused, degrading the driving feels.

To prevent such undesired events, the target slippage amount is increased with increases in the throttle opening changing rate as indicated in FIG. 5B to temporarily increase the actual slippage amount, for example, in the form of a pulse, as indicated in FIG. 5C. Then, by operation of the first control unit, which specifies the response behavior of the actual slippage amount to the target slippage amount that is varied stepwise, the actual slippage amount is smoothly converged to a constant value again. Thus, the shock caused when the actual slippage amount is caused to converge to a constant value can also be reduced.

Further, the extent of increase of the target slippage amount may be determined either in accordance with the throttle opening changing rate or to a predetermined constant value. If the extent of increase of the target slippage amount is determined in accordance with the throttle opening changing rate, it can be determined to a value suitable to the current driving conditions. On the other hand, if the extent of increase of the target slippage amount is determined to a predetermined value, the calculation for value determination becomes unnecessary, thus simplifying the control process.

Furthermore, the period for increased target slippage amounts may be determined either in accordance with the throttle opening changing rate or to a predetermined constant value. If the period for increased target slippage amounts is determined in accordance with the throttle opening changing rate, it can be determined to a value suitable to the driving conditions. On the other hand, if the period for increased target slippage amounts is determined at a predetermined value, the calculation for value determination is unnecessary, thus simplifying the control process.

In addition, the target slippage amount may be values that change stepwise.

The lock-up clutch slip control for automatic transmissions will be described hereinafter further in detail with reference to the presently preferred embodiments.

[Embodiment 1]

Figure 7:
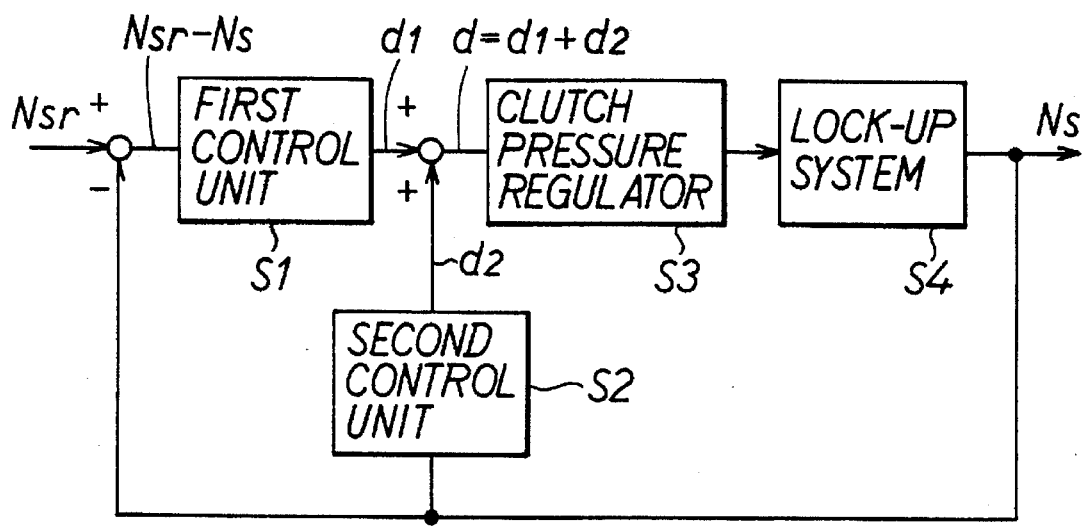
FIG. 7 is a block diagram of the control system according to Embodiment 1 of the present invention.

FIG. 7 shows a block diagram of the control system according to Embodiment 1.

Referring to FIG. 7, the slip control apparatus according to the embodiment comprises the first control unit S1 that outputs a first control value d1 based on the difference between ERR (=Nsr−Ns) between a target slippage amount Nsr and an actual slippage amount Ns, and the second control unit S2 that outputs a second control value d2 based on the actual slippage amount Ns, and a clutch pressure regulating unit S3 (pressure regulator in FIG. 1) that controls the electromagnetic valve 1 and the like to control a lock-up system S4 on the basis of the sum d (=d1+d2) of the first and second control values.

The first control unit S1 specifies the response behavior of the actual slippage amount Ns to the target slippage amount Nsr during the transitional period when the lock-up clutch 43 is shifting from the disengaged state into the slipping state. On the other hand, the second control unit S2, provided independently of the first control unit S1, controls the actual slippage amount Ns so as to follow the target slippage amount Nsr in response to external disturbances, such as throttle opening fluctuation, when the slipping of the lock-up clutch 43 has reached the steady state where a predetermined slippage amount is maintained, from the transitional state.

The designing procedure of the control system will be described.

(Procedure 1)

Figure 8A:
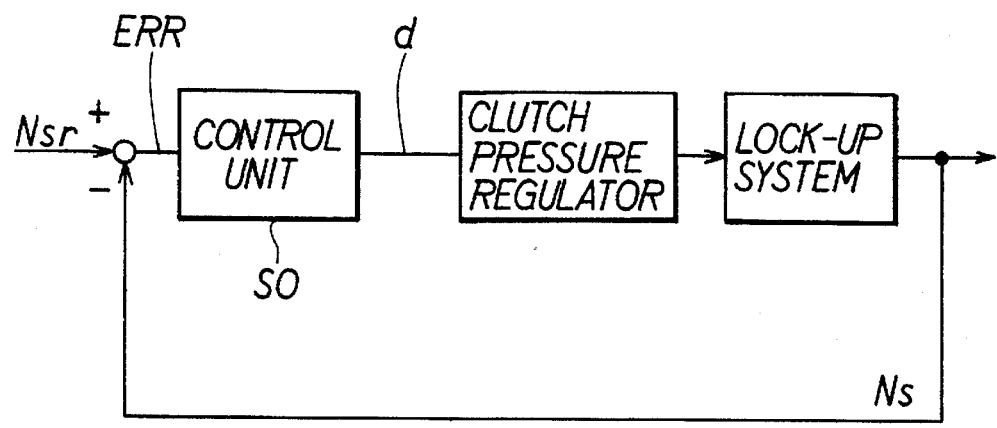
Figure 8A:
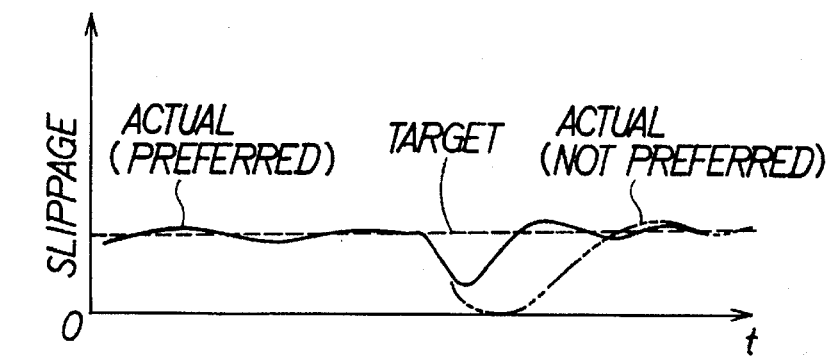
Figure 8A:
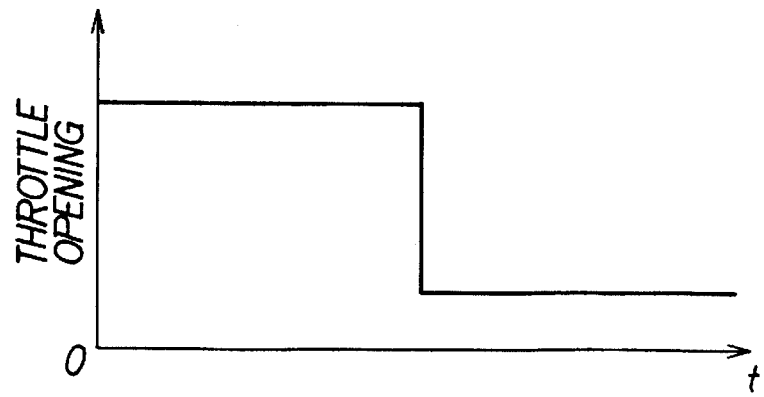

First, a control system as illustrated in FIG. 8A is constructed. A control unit S0 calculates a clutch pressure control duty d based on the difference ERR (=Nsr−Ns) between the target slippage amount Nsr and the actual slippage amount Ns by using equation (1):

$$d = kp \cdot ERR + ki \cdot \int ERR \, dt + kd \cdot (d/dt) ERR \qquad (1)$$

The values kp, ki, kd are adjusted such that the actual slippage amount Ns will quickly return to the target slippage amount Nsr in response to off-throttling as indicated in FIG. 8B1 and 8B2. The respective control gains when this returning response has been tuned to a preferable state are determined as kp0, ki0, kd0.

(Procedure 2)

Then, a control system as illustrated in FIG. 7 is constructed. The first control unit S1 calculates a clutch pressure control duty d1 based on the difference ERR between the target slippage amount Nsr and the actual slippage amount Ns by using equation (2):

$$d1 = kp1 \cdot ERR + ki1 \cdot \int ERR \cdot dt + kd1 \cdot (d/dt) ERR \qquad (2)$$

The second control unit S2 calculates a clutch pressure control duty d2 based on the actual slippage amount Ns by using equation (3):

$$d2 = kp2 \cdot Ns + ki2 \cdot \int Ns \cdot dt + kd2 \cdot (d/dt) Ns \qquad (3)$$

In addition, the total clutch pressure control duty d is calculated by using equation (4):

$$d = d1 + d2 \qquad (4)$$

Figure 18A:
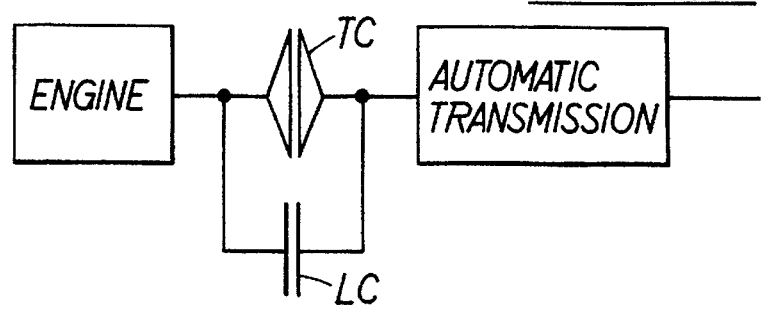
FIGS. 18A to 18C illustrate the conventional control.
Figure 18B:
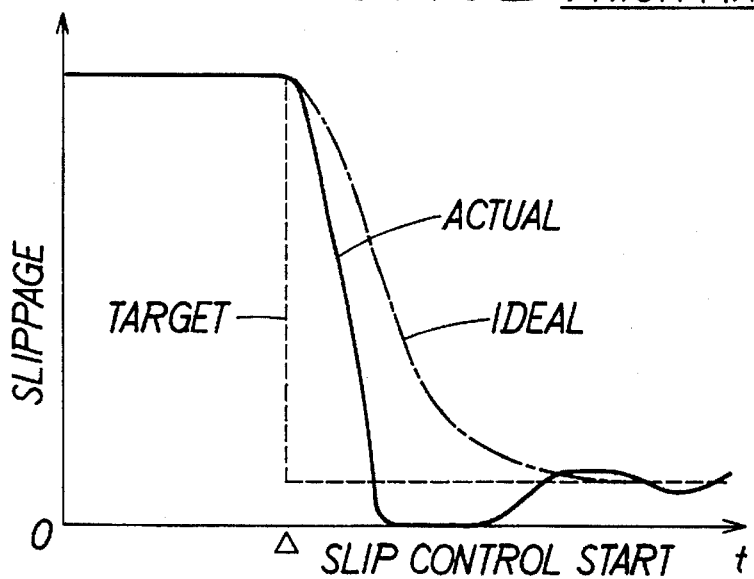
Figure 18C:
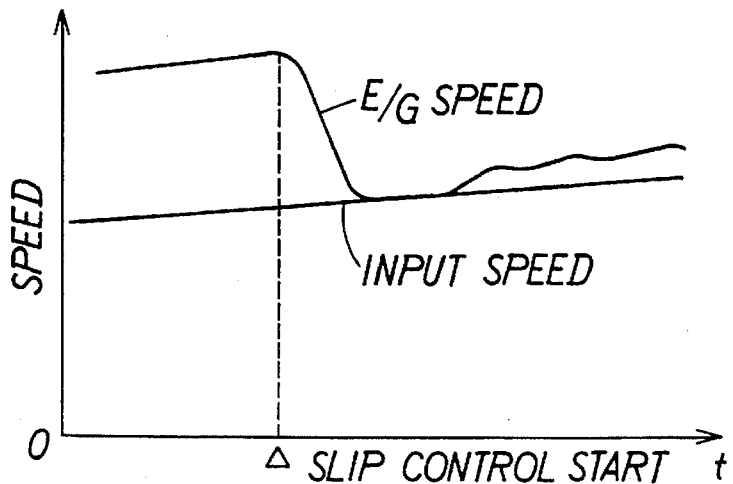
Figure 19A:
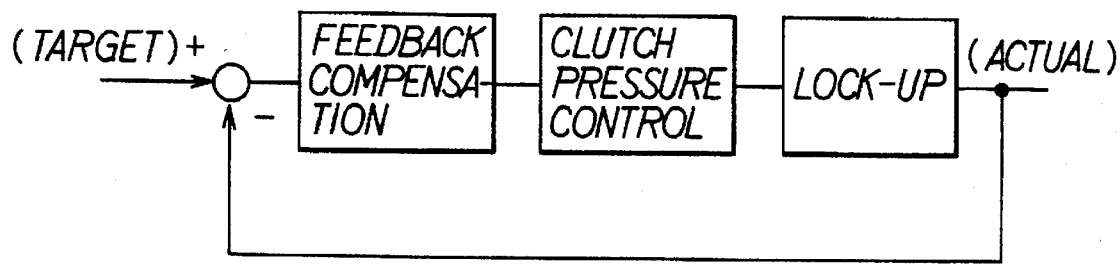
Figure 19A:
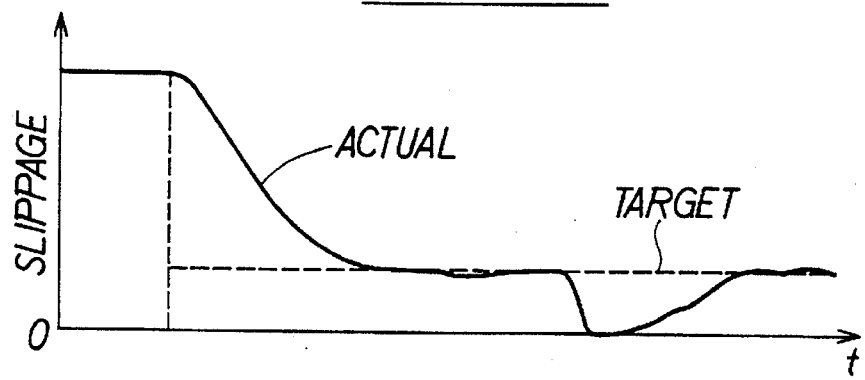
Figure 19A:
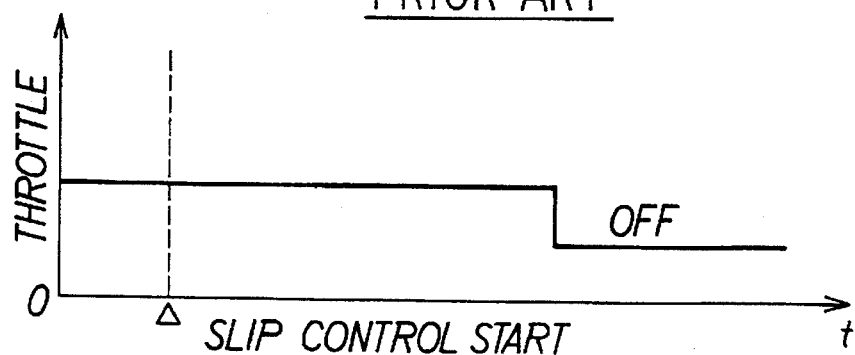

The values kp1, ki1, kd1 are adjusted such that when the target Nsr is varied stepwise, the actual slippage amount Ns will vary in a preferred manner as indicated by the dot-dash line (ideal) in FIG. 18B. The respective control gains when this response has been tuned to a preferable state are determined as kp10, ki10, kd10. Then, the values kp2, ki2, kd2 are determined by using equations (5) to (7):

$$kp2=kp0-kp10 \qquad (5)$$

$$ki2=ki0-ki10 \qquad (6)$$

$$kd2=kd0-kd10 \qquad (7)$$

With this construction, the control system controls the actual slippage amount Ns during the transitional period when the lock-up clutch 43 is shifting from the disengaged state into the slipping state in a preferred manner, and also controls so that the actual slippage amount Ns will quickly come to follow the target slippage amount in response to an external disturbance such as a throttle opening change.

The basis for these advantages will be discussed.

Figure 9A:
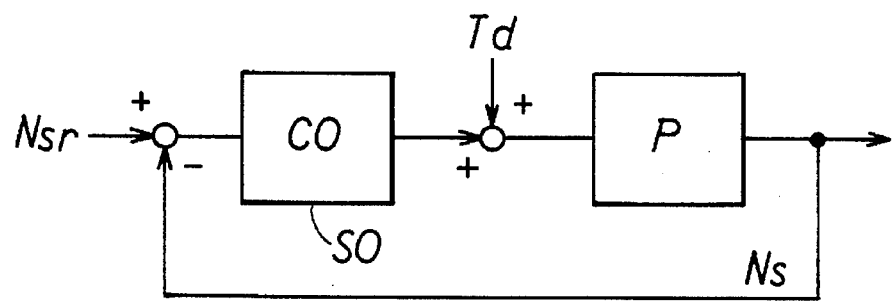
FIGS. 9A, 9B illustrate that the control system according to Embodiment 1 is favorable.

FIG. 9A illustrates the control system which has been tuned to a preferred state as described in Procedure 1. In FIG. 9A: C0 indicates a transfer function of the control unit S0; P indicates a transfer function from the engaging torque of the lock-up clutch 43 to the actual slippage amount Ns thereof; and Td indicates a value of clutch pressure control duty obtained by equivalent conversion of external disturbances caused by, for example, off-throttling.

The function C0 has been tuned so as to provide a preferable response of the actual slippage amount to external disturbances such as off-throttling. The closed loop transfer characteristics from Td to the actual slippage amount Ns are expressed by equation (8):

$$Ns=P/(1+P \cdot C0) \cdot Td \qquad (8)$$

Figure 9B:
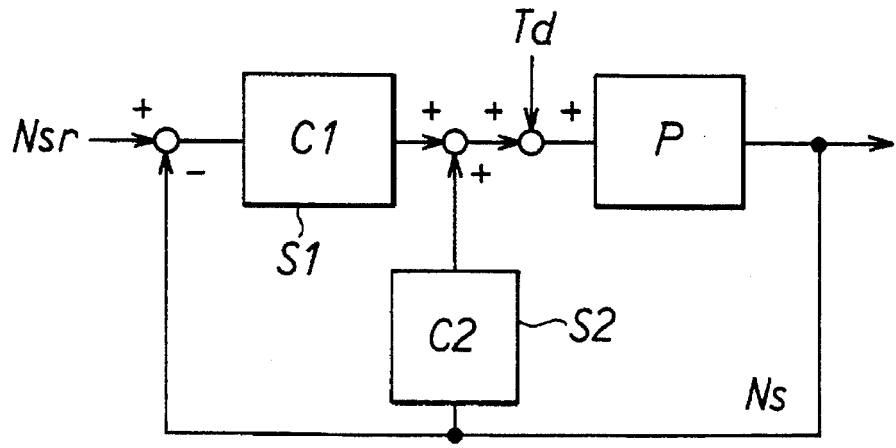

FIG. 9B illustrates the control system that has been tuned to a preferred state as in Step 2. In FIG. 9B, reference characters C1, C2 indicate the transfer functions of the first and second control units S1, S2, respectively. The transfer function C0 is determined as C0=C1+C2 because of the construction of the functions C1, C2.

The transfer function C1 has been tuned such that the actual slippage amount Ns is controlled in a preferred manner during the transitional period when the lock-up clutch 43 is shifting from the disengaged state into the slipping state. The closed loop transfer characteristics from the target slippage amount Nsr to the actual slippage amount Ns is expressed by equation (9):

$$Ns=P/(1+P \cdot (C1+C2)) \cdot Nsr = P/(1+P \cdot C0) \cdot Nsr \qquad (9)$$

The closed loop transfer characteristics from Td to Ns are expressed by equation (10), which is the same as the transfer function of the control system shown in FIG. 9A.

$$Ns=P/(1+P \cdot (C1+C2)) \cdot Td = P/(1+P \cdot C0) \cdot Td \qquad (10)$$

Considering this construction of the control system shown in FIG. 9B, it should be clear that the control system is capable of controlling the actual slippage amount Ns during the transitional period when the lock-up clutch 43 is shifting from the disengaged state into the slipping state in a preferred manner, and also controlling so that the actual slippage amount Ns will quickly come to follow the target slippage amount in response to an external disturbance such as a throttle opening change.

Although this embodiment employs PID (Proportional+Integral+Derivative) control as the first and second control units S1, S2, this restriction is not essential to the invention. The degrees of the transfer functions and the like may be determined as desired as long as the equation C0=C1+C2 is established.

Figure 10:
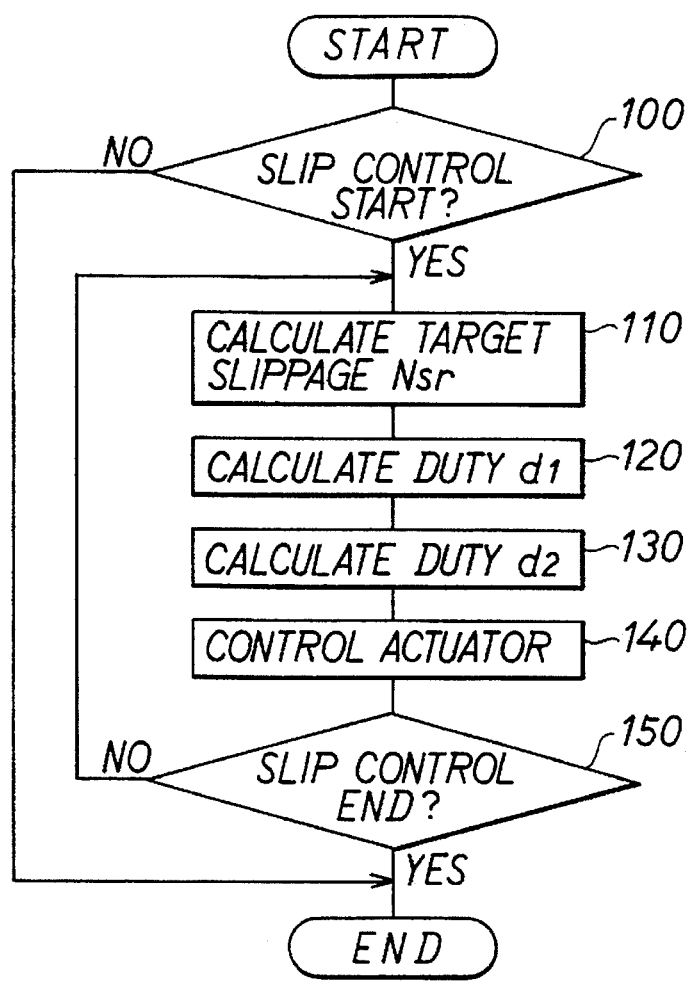
FIG. 10 is a flowchart illustrating the control according to Embodiment 1.

The control process performed by the slip control apparatus according to this embodiment will be described with reference to the flowchart of FIG. 10.

Figure 11:
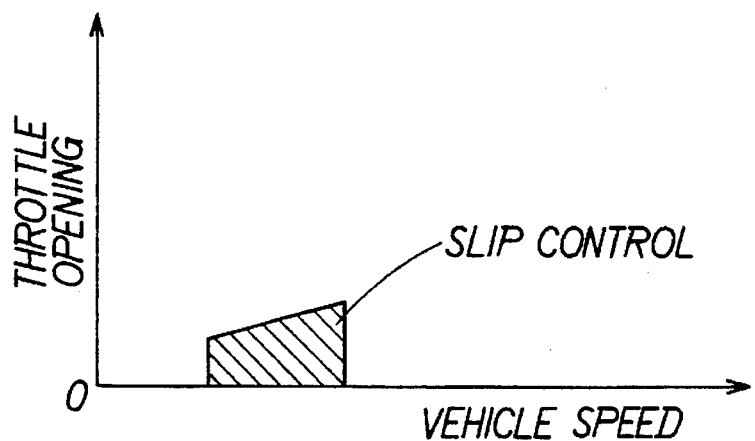
FIG. 11 illustrates a slip control region according to Embodiment 1.

The control apparatus first determines in step 100 whether the conditions for starting the slip control to maintain the slippage amount at a constant value, for example, the conditions that the current throttle opening and vehicle speed are included in a slip control region determined in a two-dimensional map involving the throttle opening and the vehicle speed as indicated in FIG. 11, are satisfied. If the affirmative determination is made in step 100, the operation proceeds to step 110. On the other hand, the negative determination temporarily ends the operation.

Step 110 sets a target slippage amount Nsr since the conditions for starting the slip control have been met. Normally, the target slippage amount Nsr is determined to a value of several tens of rotations per minute, for example, 50 rpm.

Step 120 calculates the control duty d1 of the first control unit S1 by using equation (2).

Step 130 calculates the control duty d2 of the second control unit S2 by using equation (3).

Step 140 determines the control duty d by totaling the two control duties d1 and d2, and provides an instruction to an actuator drive circuit (for driving the electromagnetic valve 1) on the basis of the control duty d.

Step 150 determines whether the conditions for ending the slip control, for example, the conditions that the current throttle opening and vehicle speed are outside the slip control region determined as indicated in FIG. 11, are satisfied. If the negative determination is made in this step, the operation goes back to step 110 to continue the slip control. On the other hand, the affirmative determination is followed by temporary end of this operation.

As described above, the slip control apparatus according to the embodiment calculates the control duty d1 by the first control unit S1, calculates the control duty d2 by the second control unit S2, and controls the electromagnetic valve 1 on the basis of the control duty d obtained by summing or totaling the two control duties d1 and d2. Advantages can thus be achieved in that the slip control apparatus is capable of controlling the actual slippage amount Ns during the transitional period when the lock-up clutch 43 is shifting from the disengaged state into the slipping state in a preferred manner, and also controlling so that the actual slippage amount Ns will quickly come to follow the target slippage amount in response to an external disturbance such as a throttle opening change.

[Embodiment 2]

Embodiment 2 will be described with the description of equivalents to those of Embodiment 1 being omitted or merely briefly made. The hardware construction of Embodiment 2 is substantially the same as that of Embodiment 1. The control process according to Embodiment 2 will be described in detail.

Figure 12:
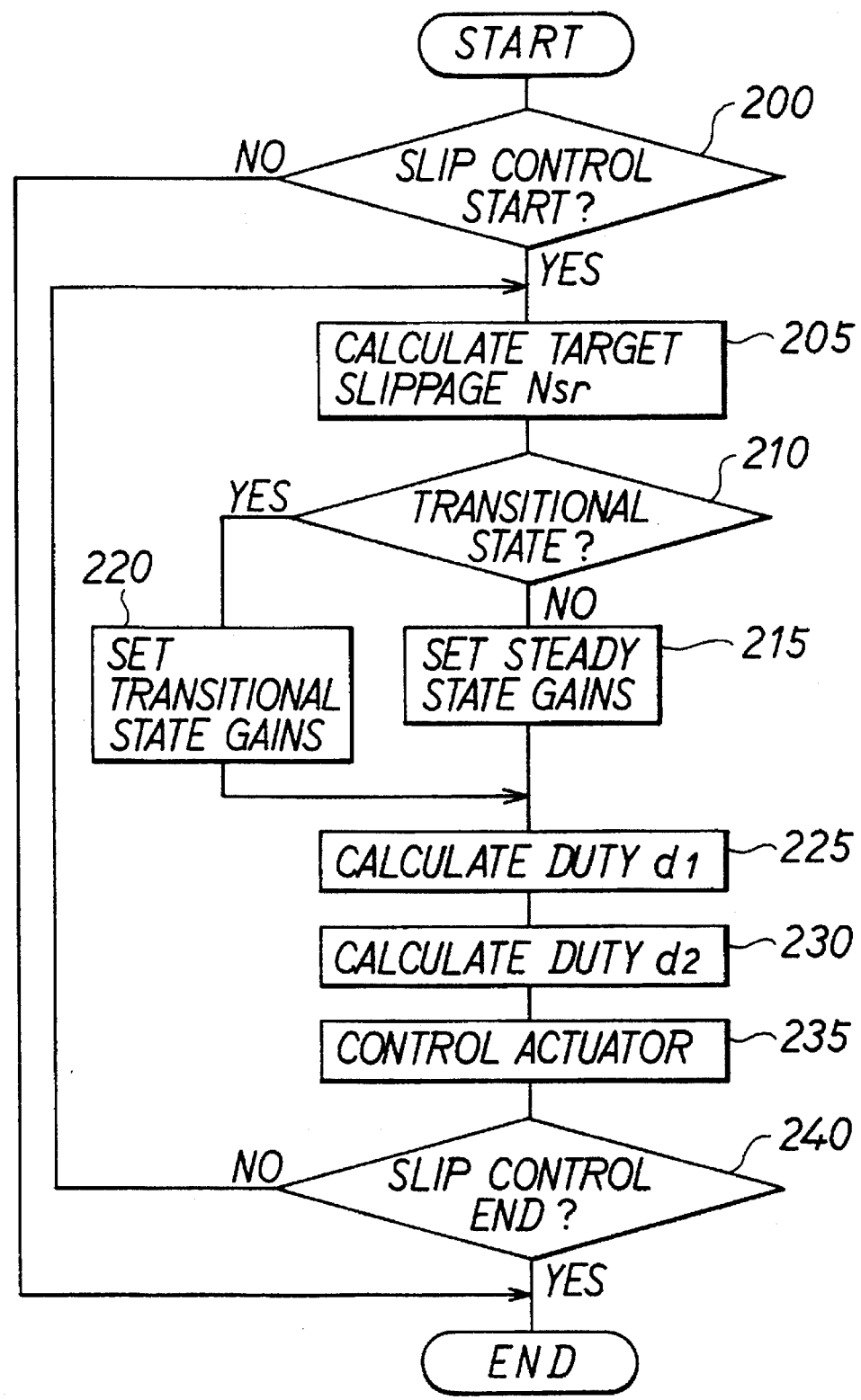
FIG. 12 is a flowchart illustrating the control according to Embodiment 2 of the present invention.

Referring to the flowchart of FIG. 12, step 200 determines whether to start the slip control on the basis of a map concerning the throttle opening and the vehicle speed. The affirmative determination in this step is followed by step 205, and the negative determination is followed by temporary end of the operation.

Step 205 calculates a target slippage amount Nsr. Normally, the target slippage amount Nsr is determined to a value of several tens of rotations per minute, for example, 50 rpm.

Subsequently, step 210 determines whether the slip control is in the transitional state. More specifically, it is determines that the control is in the transitional state, either (1) if the elapse time following the start of the slip control is within a predetermined length of time (for example, 1 second), or (2) if the difference ERR between the actual slippage amount Ns and the target slippage amount Nsr equals or exceeds a predetermined value (for example, 200 rpm). If the negative determination is made in this step, the operation proceeds to step 215. The affirmative determination is followed by step 220.

When step 210 has made the negative determination, which means that the slip control is in the steady state, step 215 determines the gains kp1, ki1, kd1, kp2, ki2, kd2 required for calculation of the control duties d1, d2, by using equations (11) to (16):

$$kp1=kp10 \tag{11}$$

$$ki1=ki10 \tag{12}$$

$$kd1=kd10 \tag{13}$$

$$kp2=kp0-kp10 \tag{14}$$

$$ki2=ki0-ki10 \tag{15}$$

$$kd2=kd0-kd10 \tag{16}$$

On the other hand, when step 210 has determined that the slip control is in the transitional state, step 220 determines the gains kp1, ki1, kd1, kp2, ki2, kd2 required for calculation of the control duties d1, d2, by using equations (17) to (22):

$$kp1=kp10 \tag{17}$$

$$ki1=0 \tag{18}$$

$$kd1=kd10 \tag{19}$$

$$kp2=kp0-kp10 \tag{20}$$

$$ki2=0 \tag{21}$$

$$kd2=kd0-kd10 \tag{22}$$

Following step 215 or 220, step 225 calculates the control duty d1 of the first control unit S1 on the basis of the gains determined in step 215 or 220, by equation (2).

Then, step 225 calculates the control duty d2 of the second control unit S2 on the basis of the gains determined in step 215 or 220, by using equation (3).

Step 235 calculates the control duty d by totaling the two control duties d1 and d2 and, based on the control duty d, provides an instruction to the actuator drive circuit for the electromagnetic valve 1.

Step 240 determines whether to end the slip control on the basis of the map concerning the throttle opening and the vehicle speed. If the negative determination is made in this step, the operation goes back to step 205 to continue the slip control. On the other hand, the affirmative determination is followed by temporary end of the control operation.

As described above, this embodiment achieves substantially the same advantages as achieved by Embodiment 1. In addition, the slip control according to Embodiment 2 changes the gains for the operation during a predetermined period following the start of the slip control, so as to restrain the integrating operation for the calculation of the control duties d1 and d2 during that period. More specifically, the gain ki1 of the integration term is changed to zero to inhibit the integrating operation during that predetermined period. Thereby, the transition control can be stably performed in the transitional period when the lock-up clutch 43 is shifting from the disengaged state into the slipping state, particularly in a region where the engine speed is relatively low, for example, when the throttle opening is small. The actual slippage amount Ns can thus be controlled to the target slippage amount Nsr in a preferred manner without causing the lockup, during the transitional period.

[Embodiment 3]

Embodiment 3 will be described with the description of equivalents to those of Embodiment 1 being omitted or merely briefly made. The hardware construction of Embodiment 3 is substantially the same as that of Embodiment 1. The control process according to Embodiment 3 will be described in detail.

Figure 13:
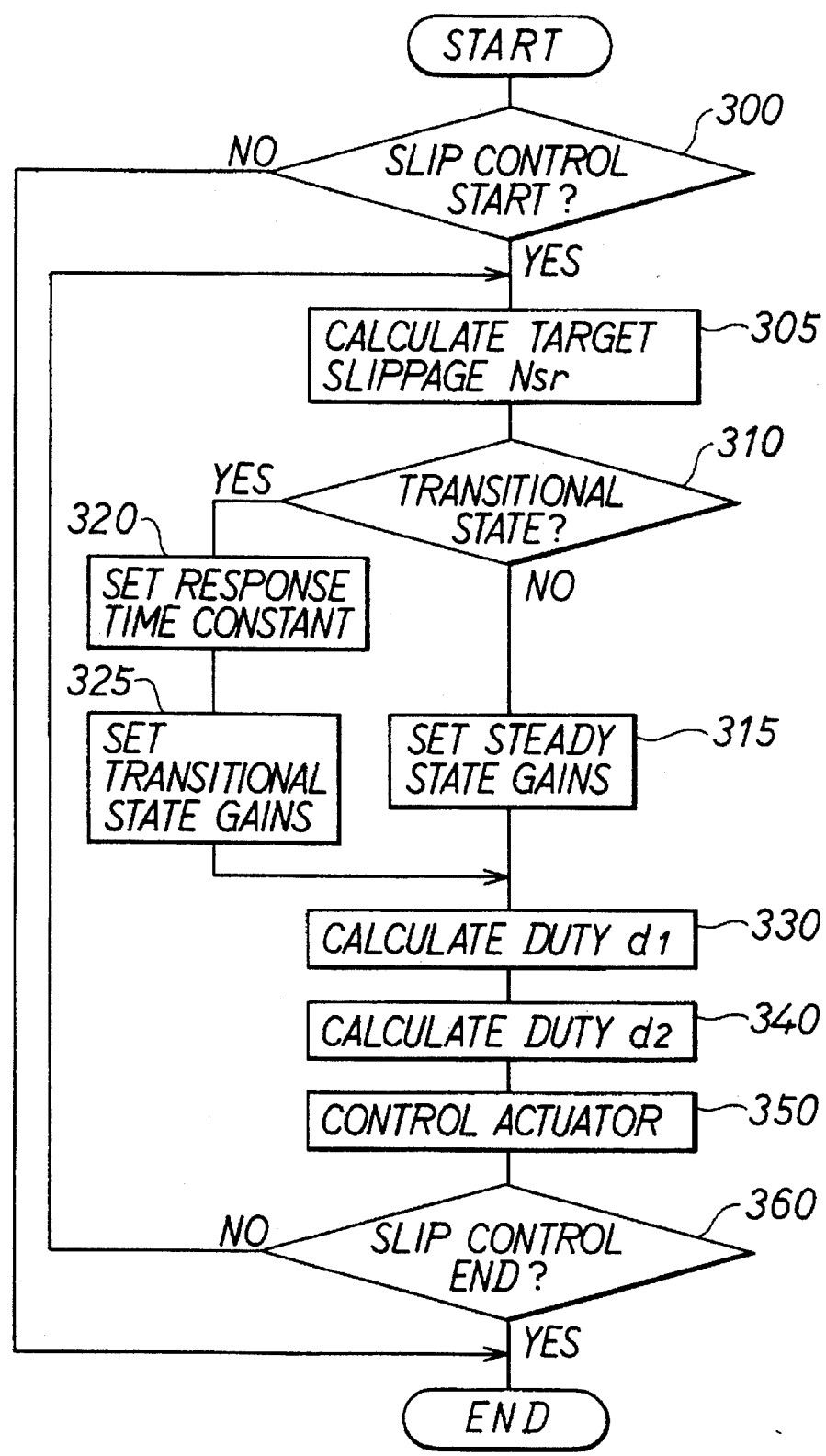
FIG. 13 is a flowchart illustrating the control according to Embodiment 3 of the present invention.

Referring to the flowchart of FIG. 13, step 300 determines whether to start the slip control on the basis of a map concerning the throttle opening and the vehicle speed. The affirmative determination in this step is followed by step 305, and the negative determination is followed by temporary end of the operation.

Step 305 calculates a target slippage amount Nsr. Normally, the target slippage amount Nsr is determined to a value of several tens of rotations per minute, for example, 50 rpm.

Subsequently, step 310 determines whether the slip control is in the transitional state, as in step 210. If the negative determination is made in this step, the operation proceeds to step 315. The affirmative determination is followed by step 320.

When step 310 has made the negative determination, which means that the slip control is in the steady state, step determines the gains kp1, ki1, kd1, kp2, ki2, kd2 required for the calculation of the control duties d1, d2, by equations (11) to (16), as in step 215:

$$kp1=kp10 \tag{11}$$

$$ki1=ki10 \tag{12}$$

$$kd1=kd10 \tag{13}$$

$$kp2=kp0-kp10 \tag{14}$$

$$ki2=ki0-ki10 \tag{15}$$

$$kd2=kd0-kd10 \tag{16}$$

Figure 14A:
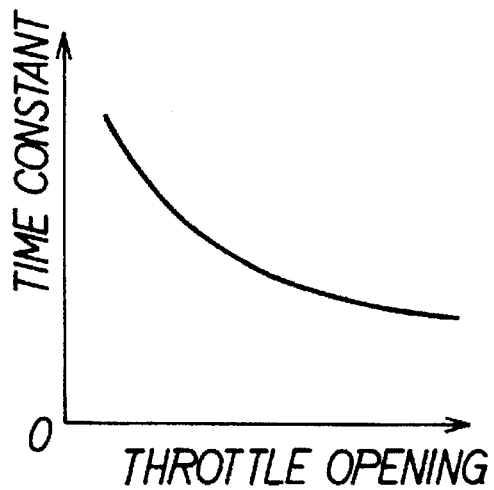
FIGS. 14A, 14B are graphs indicating maps for determining a time constant according to Embodiment 3.
Figure 14B:
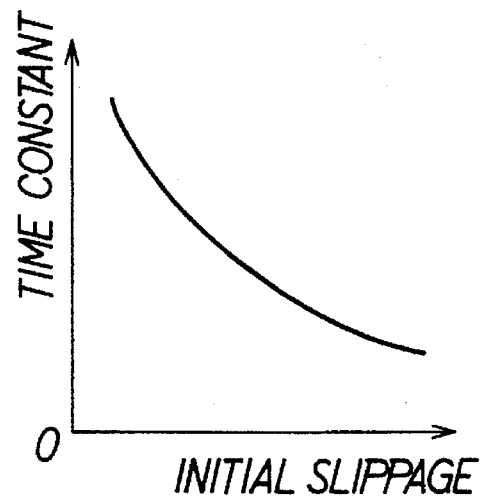

On the other hand, when step 310 has determined that the slip control is in the transitional state, step 320 determines a response time constant. More specifically, step determines a time constant in accordance with the throttle opening or the initial slippage amount by using a map as indicated in FIG. 14A or 14B.

Figure 15:
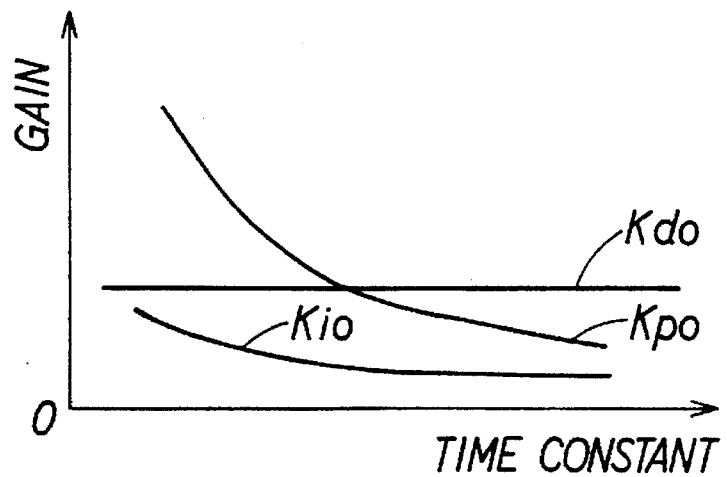
FIG. 15 is a graph indicating a map for determining gains according to Embodiment 3.

Subsequently, step 325 determines the gains required for calculation of the control duties d1 and d2 in accordance with the time constant determined in step 320. More specifically, step 325 determines the gains kp0, ki0, kd0 in accordance with the time constant by using a map as indicated in FIG. 15, and determines the gains kp1, ki1, kd1, kp2, ki2, kd2 required for calculation of the control duties d1, d2, by using equations (23) to (28):

$$kp1=kp10 \tag{23}$$

$$ki1=ki10 \tag{24}$$

$$kd1=kd10 \tag{25}$$

$$kp2=kp0-kp10 \tag{26}$$

$$ki2=ki0-ki10 \tag{27}$$

$$kd2=kd0-kd10 \tag{28}$$

Following step 315 or 325, step 330 calculates the control duty d1 of the first control unit S1 on the basis of the gains determined in step 315 or 325, by equation (2).

Then, step 340 calculates the control duty d2 of the second control unit S2 on the basis of the gains determined in step 315 or 325, by equation (3).

Step 350 calculates the control duty d by totaling the two control duties d1 and d2 and, based on the control duty d, provides an instruction to the actuator drive circuit.

Step 360 determines whether to end the slip control on the basis of the map concerning the throttle opening and the vehicle speed. If the negative determination is made in this step, the operation goes back to step 305 to continue the slip control. On the other hand, the affirmative determination is followed by temporary end of the control operation.

As described above, this embodiment achieves substantially the same advantages as achieved by Embodiment 1. In addition, the slip control apparatus according to Embodiment 3 determines the time constant in accordance with the throttle opening or the initial slippage amount. More specifically, the time constant is reduced with increases of the throttle opening or the initial slippage amount. Therefore, the slip control apparatus prevents occurrence of a great difference ERR between the target slippage amount Nsr and the actual slippage amount Ns in the transitional state, in particular, for example, when the throttle opening is small. Thus, the clutch control hydraulic pressure can be corrected in time even when the actual slippage amount Ns is rapidly reduced, so that the actual slippage amount Ns can be controlled to the target slippage amount Nsr in a preferred manner without causing the lockup.

In addition, if both the throttle opening and the initial slippage amount are used to determine the time constant, more precise control can be performed.

[Embodiment 4]

Embodiment 4 will be described with the description of equivalents to those of Embodiment 1 being omitted or merely briefly made. The hardware construction of Embodiment 4 is substantially the same as that of Embodiment 1. The control process according to Embodiment 4 will be described in detail.

Figure 16:
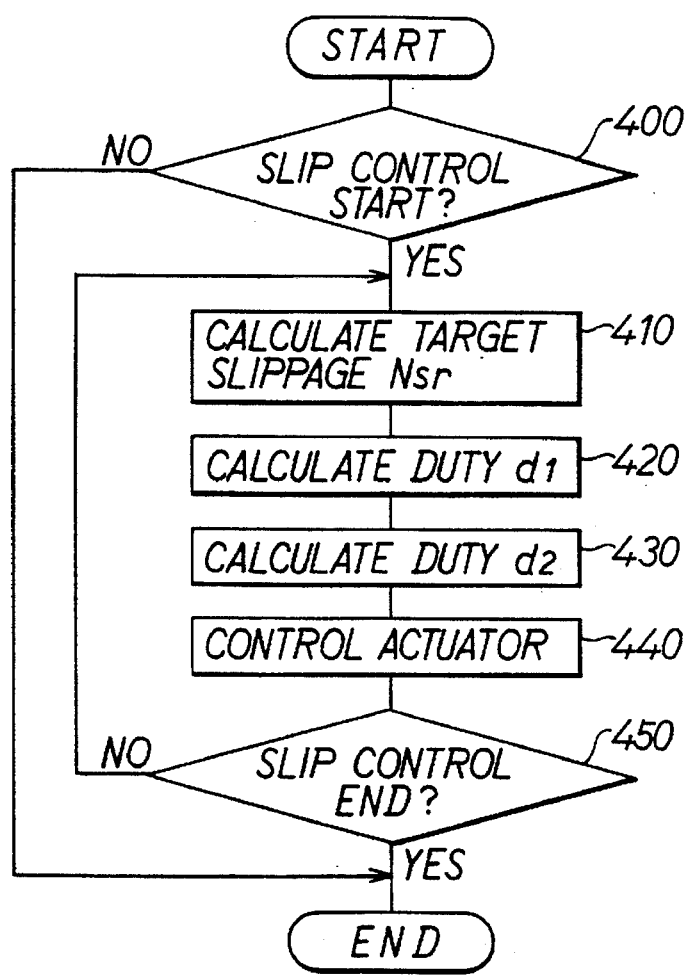
FIG. 16 is a flowchart illustrating the control according to Embodiment 4.

Referring to the flowchart of FIG. 16, step 400 determines whether to start the slip control on the basis of a map concerning the throttle opening and the vehicle speed. The affirmative determination in this step is followed by step 410, and the negative determination is followed by temporary end of the operation.

Figure 17:
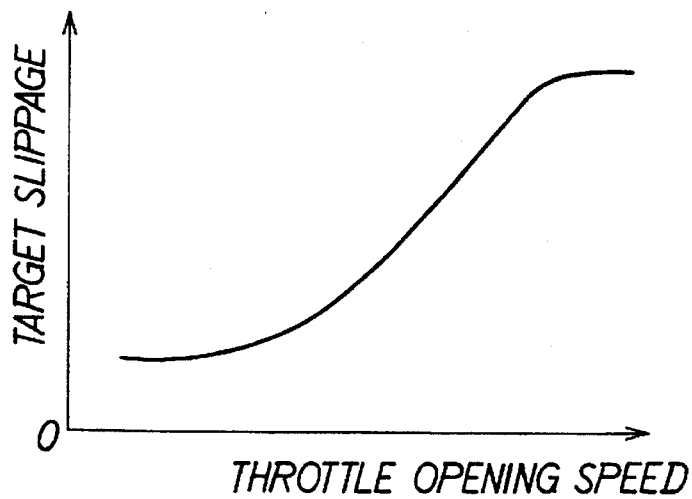
FIG. 17 is a graph indicating a map for determining target slippage amount according to Embodiment 4.

Step 410 calculates a target slippage amount Nsr. More specifically, the target slippage amount Nsr is determined in accordance with the throttle opening changing rate (spped) by using a map as indicated in FIG. 17. Subsequently, step 420 calculates the control duty d1 of the first control unit S1 by equation (2).

Then, step 430 calculates the control duty d2 of the second control unit S2 by equation (3).

Step 440 calculates the control duty d by totaling the two control duties d1 and d2 and, based on the control duty d, provides an instruction to the actuator drive circuit. Step 450 determines whether to end the slip control on the basis of the map concerning the throttle opening and the vehicle speed. If the negative determination is made in this step, the operation goes back to step 410 to continue the slip control. On the other hand, the affirmative determination is followed by temporary end of the control operation.

As described above, this embodiment achieves substantially the same advantages as achieved by Embodiment 1. In addition, the slip control according to Embodiment 4 determines the target slippage amount Nsr in accordance with the throttle opening changing rate. More specifically, the target slippage amount Nsr is increased with increases of the throttle opening changing rate if the throttle opening changing rate is positive values. Therefore, stable slip control can be performed without degrading the driving feels or the like even if the throttle opening is increased while the slipping of the lock-up clutch 43 is controlled in the steady state.

It is to be understood that the invention is not limited to the disclosed embodiments. To the contrary, the invention is intended to cover various modifications and equivalent arrangements included within the spirit and scope of the appended claims. In addition, the designing method for control units according to the invention can be applied to any apparatus that controls the engaging torque of a lock-up clutch.

What is claimed is:

1. A lock-up clutch slip control apparatus for an automatic transmission having slip control means for feedback-controlling engaging pressure of a lock-up clutch so that slippage amount of the lock-up clutch becomes equal to a predetermined target value, the apparatus comprising:

a first control unit for specifying response behavior of actual slippage amount to a target slippage amount while the lock-up clutch is in a transitional state where the lock-up clutch is shifting from a disengaged state to a slipping state, the first control unit varying a time constant of response of the actual slippage amount in accordance with at least one of throttle opening and initial slippage amount; and a second control unit for controlling the actual slippage amount so as to follow the target slippage amount when the slipping of the lock-up clutch has reached a steady state where a predetermined slippage amount is maintained from the transitional state, the second control unit being provided independently from the first control unit.

2. A lock-up clutch slip control apparatus for an automatic transmission according to claim 1, wherein the second control unit restrains integration of a difference between the actual slippage amount and the target slippage amount in the transitional state where the lock-up clutch is shifting from the disengaged state to the slipping state.

3. A lock-up clutch slip control apparatus for an automatic transmission according to claim 2, wherein the restraint of integration by the second control unit includes inhibition of the integration over a predetermined period.

4. A lock-up clutch slip control apparatus for an automatic transmission according to claim 1, wherein the time constant of response of the actual spippage amount is set small as said one of the throttle opening and the intial slippage amount is large.

5. A lock-up clutch slip control apparatus for an automatic transmission according to claim 1, wherein the target slippage amount is varied in accordance with throttle opening changing rate when the slipping of the lock-up clutch has reached the steady state from the transitional state.

6. A lock-up clutch slip control apparatus for an automatic transmission according to claim 5, wherein the target slippage amount is increased if the throttle opening changing rate is a positive value.

7. A lock-up clutch slip control apparatus for an automatic transmission according to claim 6, wherein extent of increase of the target slippage amount is determined either in accordance with the throttle opening changing rate or to a predetermined constant value.

8. A lock-up clutch slip control apparatus for an automatic transmission according to claim 6, wherein period for increase of the target slippage amount is determined either in accordance with the throttle opening changing rate or to a predetermined constant value.

9. A lock-up clutch slip control apparatus for an automatic transmission according to claim 1, wherein the target slippage amount is varied stepwise.

10. A lock-up clutch slip control method for an automatic transmission having slip control means for feedback-controlling engaging pressure of a lock-up clutch so that slippage amount of the lock-up clutch becomes equal to a predetermined target value, the method comprising the steps of:

specifying response behavior 0f actual slippage amount to a target slippage amount while the lock-up clutch is in a transitional state where the lock-up clutch is shifting from a disengaged state to a slipping state;

controlling the actual slippage amount so as to follow the target slippage amount when the slipping of the lock-up clutch has reached a steady state where a predetermined slippage amount is maintained from the transitional state, the controlling step being performed independently of the specifying step; and varying a time constant of response of the actual slippage amount in accordance with at least one of throttle opening and initial slippage amount.

11. A lock-up clutch slip control method according to claim 10, wherein the controlling step restrains integration of a difference between the actual slippage amount and the target slippage amount in the transitional state where the lock-up clutch is shifting from the disengaged state to the slipping state.

12. A lock-up clutch slip control method according to claim 11, wherein the restraint of integration includes inhibition of the integration over a predetermined period.

13. A lock-up clutch slip control method according to claim 10, wherein the time constant of response of the actual spippage amount is set small as said one of the throttle opening and the intial slippage amount is large.

14. A lock-up clutch slip control method according to claim 10, wherein the target slippage amount is varied in accordance with throttle opening changing rate when the slipping of the lock-up clutch has reached the steady state from the transitional state.

15. A lock-up clutch slip control method according to claim 14, wherein the target slippage amount is increased if the throttle opening changing rate is a positive value.

16. A lock-up clutch slip control method according to claim 15, wherein extent of increase of the target slippage amount is determined either in accordance with the throttle opening changing rate or to a predetermined constant value.

17. A lock-up clutch slip control method according to claim 15, wherein period for increase of the target slippage amount is determined either in accordance with the throttle opening changing rate or to a predetermined constant value.

18. A lock-up clutch slip control method according to claim 10, wherein the target slippage amount is varied stepwise.

* * * * *